(No Model.)
R. HARRIS.
MILL.
No. 517,104. Patented Mar. 27, 1894.
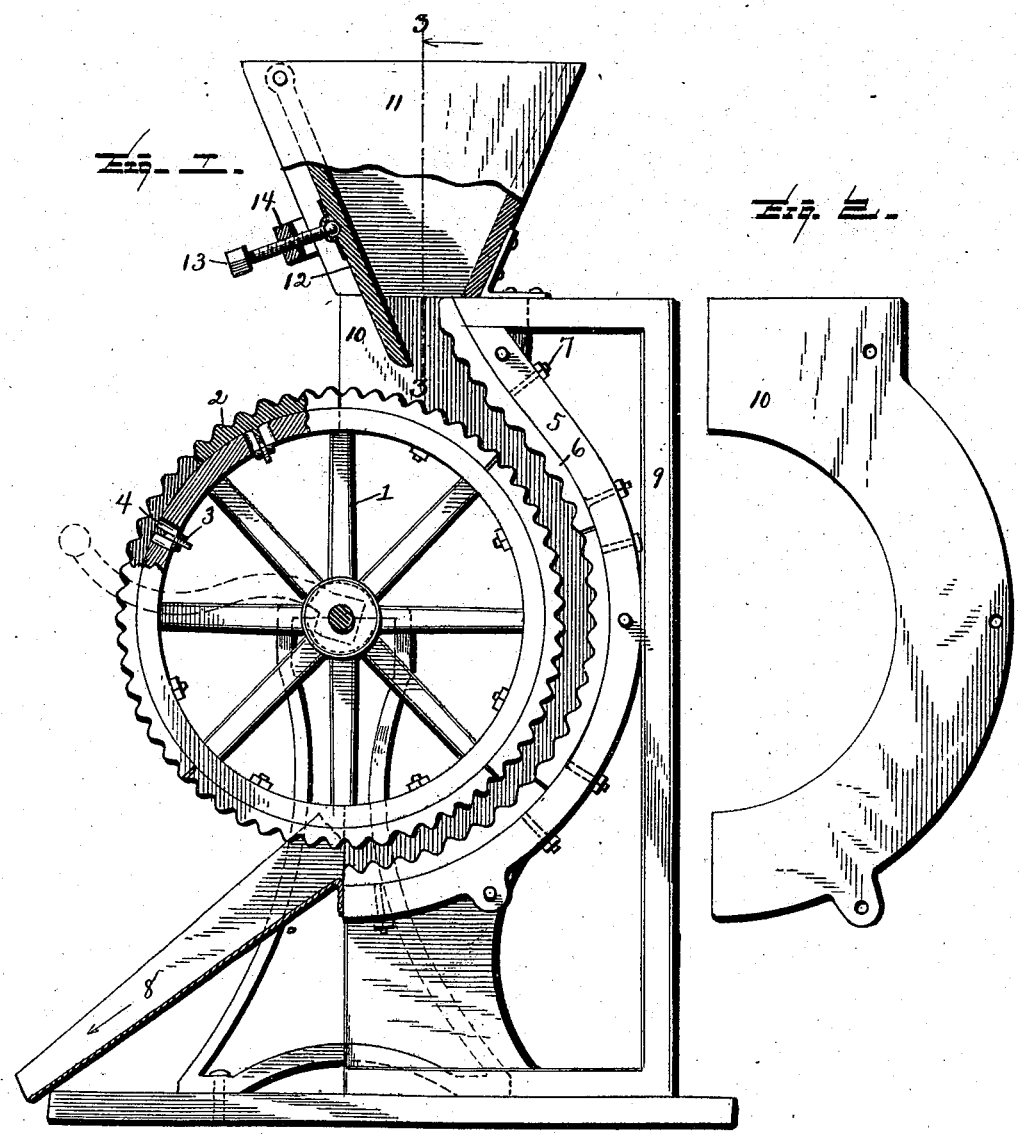
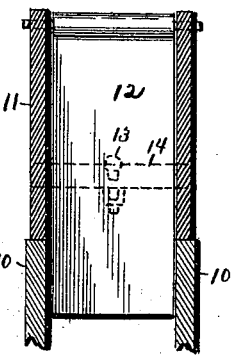
Witnesses
L. C. Hills
Geo. P. Thayer
Inventor
Robert Harris.
By Glascock & Co
Attorneys.

UNITED STATES PATENT OFFICE.

ROBERT HARRIS, OF PORT HURON, MICHIGAN.

MILL.

SPECIFICATION forming part of Letters Patent No. 517,104, dated March 27, 1894.

Application filed April 10, 1893. Serial No. 469,807. (No model.)

*To all whom it may concern:*

Be it known that I, ROBERT HARRIS, a citizen of the United States, residing at Port Huron, in the county of St. Clair and State of Michigan, have invented a certain new, useful, and valuable Improvement in Mills, of which the following is a full, clear, and exact description.

My invention has relation to cylinder and concave mills and it consists in the novel construction and arrangement of its parts.

In the accompanying drawings, Figure 1, is a side view of my invention partly in section and having a part removed. Fig. 2, is a view of the removed part. Fig. 3, is a detail transverse sectional view of the hopper cut on the line 3, 3, of Fig. 1.

My invention is described as follows:—It consists of the revolving cylinder 1, journaled in a suitable frame. Said cylinder may be operated either by hand or by steam or other power. The two journals of the said cylinder are all the journals that are employed in the mill. To the periphery of the cylinder 1, are secured the renewable segments 2. Said segments are provided with suitable teeth. The segments 2, are secured to the periphery of the said cylinder by means of the bolts and nuts 3, which pass through the perforations 4, in the periphery of said cylinder. Said perforations 4, are preferably elongated as shown in order to allow for any irregularity in the relative position of the bolts when the segments are changed. Opposite one side of the cylinder 1, is the concave 5. The inner surface of said concave is also provided with a number of renewable segments 6. Said segments are also provided with suitable teeth and are secured in place by means of the bolts and nuts 7. The distance between the periphery of the cylinder 1, and the inner surface of the concave 5, gradually diminishes from the top of the mill toward the bottom. At the lower end of the concave is secured the chute 8. The concave is braced by the upright 9, and to each side of the said concave is secured a removable section 10, the edges of which overlap the two sets of segments.

A removable hopper 11, is attached to the top of the mill. Said hopper can be replaced by a larger or smaller one if so desired. In order to regulate the flow of the material being ground, the said hopper is provided with a hinged side 12, which extends somewhat below the lower edges of the hopper. One end of the threaded bolt 13, is swiveled to the side of said hopper. Said bolt passes through a threaded perforation in the arm 14, which is secured to the stationary sides of the said hopper. Thus it will be seen that by turning the said bolt 13, the hinged side 12, of the said hopper is swung in or out and held in the desired position. The material passes between the lower end of the hinged side 12, and the inner surface of the concave 5, and from thence between the two sets of segments and is ground and discharged into the chute 8.

Any kind of material can be crushed, ground or pulverized with this mill and as all the wearing parts are interchangeable the mill can be easily and quickly repaired. As the cylinder 1, is constantly revolved in the same direction there is no lost motion.

Having described my invention, what I claim as new, and desire to secure by Letters Patent, is—

In a cylinder and concave mill, the cylinder having elongated perforations cut in its periphery, the elongations of said perforations extending with the circumference of the cylinder, the renewable segments provided with teeth and suitable bolts and nuts secured to the periphery of said cylinder, said bolts passing through the elongated perforations in said cylinder; the concave provided with suitable teeth on its inner surface, as set forth.

In testimony whereof I affix my signature in presence of two witnesses.

ROBERT HARRIS.

Witnesses:
WM. H. CARSON,
WM. T. MITCHELL.